(12) United States Patent
Chen Feng

(10) Patent No.: US 9,908,192 B2
(45) Date of Patent: Mar. 6, 2018

(54) CIRCULAR SAW MACHINE FOR SAWING WORKPIECES OF VARIOUS LENGTHS

(71) Applicant: KENTAI MACHINERY CO., LTD., Taichung (TW)

(72) Inventor: Huang Chen Feng, Taichung (TW)

( * ) Notice: Subject to any disclaimer, the term of this patent is extended or adjusted under 35 U.S.C. 154(b) by 405 days.

(21) Appl. No.: 14/277,050

(22) Filed: May 14, 2014

(65) Prior Publication Data

US 2015/0328699 A1 Nov. 19, 2015

(51) Int. Cl.
*B23D 47/04* (2006.01)

(52) U.S. Cl.
CPC .......... *B23D 47/04* (2013.01); *B23D 47/045* (2013.01); *Y10T 83/654* (2015.04)

(58) Field of Classification Search
CPC ...... B23D 47/00; B23D 47/04; B23D 47/045; Y10T 83/7487; Y10T 83/75; Y10T 83/7513
USPC .................................................. 83/452–456
See application file for complete search history.

(56) References Cited

U.S. PATENT DOCUMENTS

| | | | | |
|---|---|---|---|---|
| 4,766,790 A * | 8/1988 | Harris | B23D 53/08 | 83/56 |
| 5,353,910 A * | 10/1994 | Harris | B23D 47/042 | 198/345.1 |
| 5,492,042 A * | 2/1996 | Salvia | B23D 47/045 | 83/104 |
| 5,918,868 A * | 7/1999 | Bruchman | B23B 31/4033 | 269/238 |
| 6,688,198 B2 * | 2/2004 | Matsumoto | B26D 1/0006 | 83/139 |
| 6,698,159 B2 * | 3/2004 | Harris | B23D 47/04 | 83/247 |
| 8,783,143 B2 * | 7/2014 | Kollman | B23D 23/00 | 83/167 |
| 2002/0092394 A1 * | 7/2002 | Rathert | B26D 7/025 | 83/213 |
| 2010/0170374 A1 * | 7/2010 | Galas | B23D 51/02 | 83/13 |
| 2010/0199824 A1 * | 8/2010 | Remmert | B23D 23/00 | 83/444 |
| 2011/0232447 A1 * | 9/2011 | Jaynes | B26D 1/085 | 83/452 |
| 2013/0186246 A1 * | 7/2013 | Franze | B26D 1/06 | 83/452 |
| 2015/0321272 A1 * | 11/2015 | Chen Feng | B23D 47/04 | 83/452 |

* cited by examiner

*Primary Examiner* — Jason Daniel Prone
*Assistant Examiner* — Richard Crosby, Jr.

(57) ABSTRACT

A circular saw machine contains a first clamping device, a second clamping device, a holding plate, a feeding means, and a sawing device. The first clamping device includes a first clamp mount, a movable clamp block, and a first upper clamp block, the first clamp mount has a first fixing arm, a first holder, a placing portion and a first fixed clamp block. The second clamping device includes a second clamp mount, a second movable clamp block, and a second upper clamp block, the first clamp mount has a second clamp arm, a second holder, and a second fixed clamp block. The holding plate is secured on a top end of the second clamp arm. The feeding means is disposed on the first clamping device. The sawing device includes a saw disc.

6 Claims, 10 Drawing Sheets

CIRCULAR SAW MACHINE FOR SAWING WORKPIECES OF VARIOUS LENGTHS

FIELD OF THE INVENTION

The present invention relates to a circular saw machine which saws workpieces of various lengths.

BACKGROUND OF THE INVENTION

With reference to FIG. 1, a conventional circular saw machine contains a feeding mechanism 10, a clamping mechanism 11, and a sawing mechanism 12, wherein the clamping mechanism 11 has an inner clamp device 13, an outer clamp device 14 and an upper clamp device 15. The feeding mechanism 10 clamps a non-saw workpiece A to move toward the clamping mechanism 11, and the inner clamp device 13, the outer clamp device 14 and the upper clamp device 15 clamp an end portion of the non-saw workpiece A, and then the sawing mechanism 12 moves forwardly so that a saw disc 16 saws the non-saw workpiece A into a sawed workpiece A1 at a sawing gap between the inner clamp device 13 and the outer clamp device 14.

Thereby, the outer clamp device 14 moves a distance away from the saw disc 16 to unclamp the sawed workpiece A1, thus avoiding the sawed workpiece A1 being sucked by a vacuum suction from the saw disc 16.

Thereafter, the sawed workpiece A1 falls into a collecting chamber automatically, and the outer clamp device 14 has an outer holder 17, a top end of which is a tilted face for supporting the non-saw workpiece A, and after the outer clamp device 14 unclamps the sawed workpiece A1, the sawed workpiece A1 falls downwardly by using the outer holder 17.

However, the top end of the outer holder 17 is the tilted face, so when the sawed workpiece A1 is in a long length, the outer clamp device 14 cannot clamp the sawed workpiece A1 securely, and the sawed workpiece A1 touches the saw disc 16 and is sawed by the saw disc 16, thus damaging the sawed workpiece A1.

The present invention has arisen to mitigate and/or obviate the afore-described disadvantages.

SUMMARY OF THE INVENTION

The primary object of the present invention is to provide a circular saw machine which saws workpieces of various lengths.

DETAILED DESCRIPTION OF THE PREFERRED EMBODIMENTS

Figure 1:
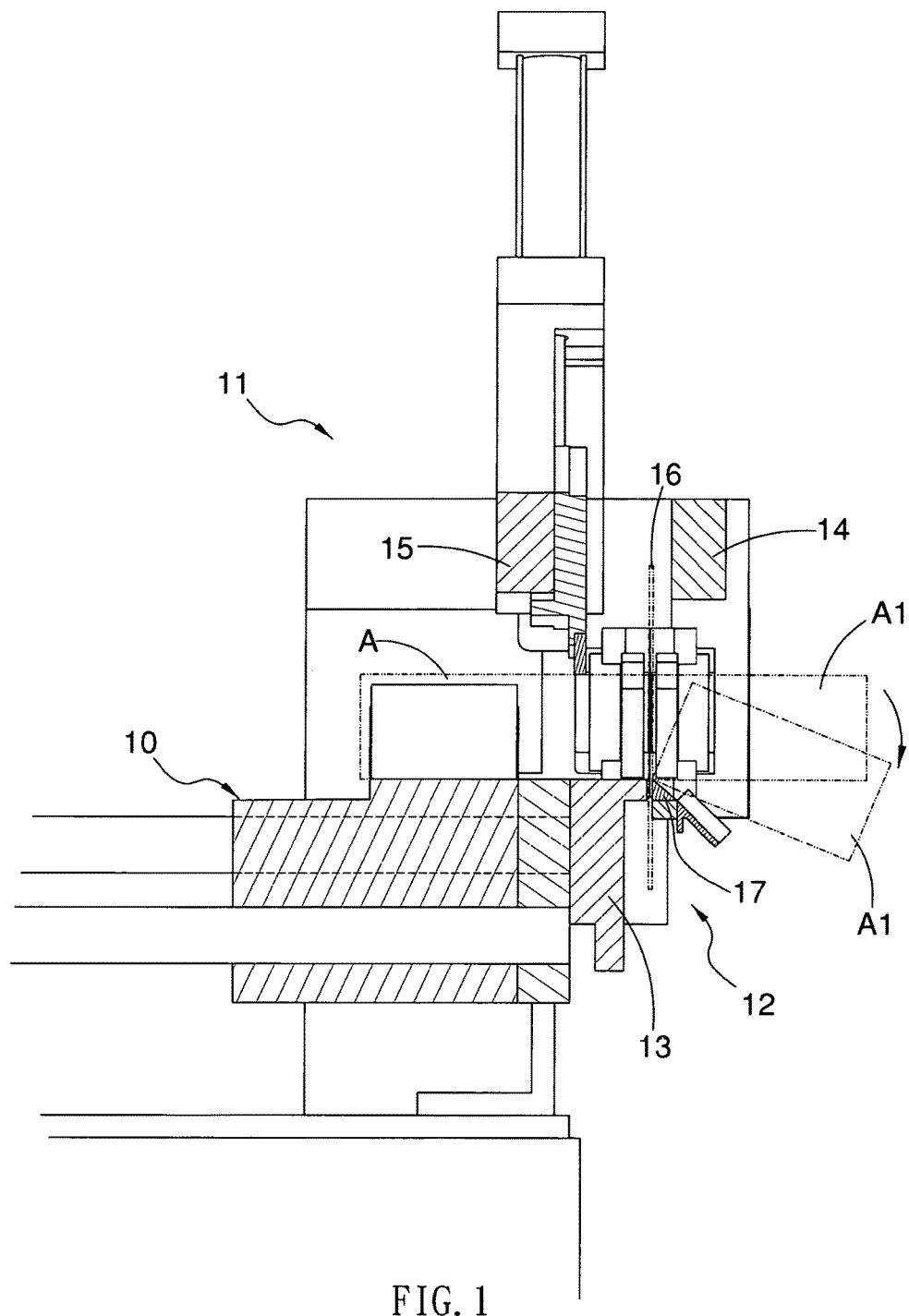
FIG. 1 is a cross sectional view of a conventional circular saw machine.
Figure 2:
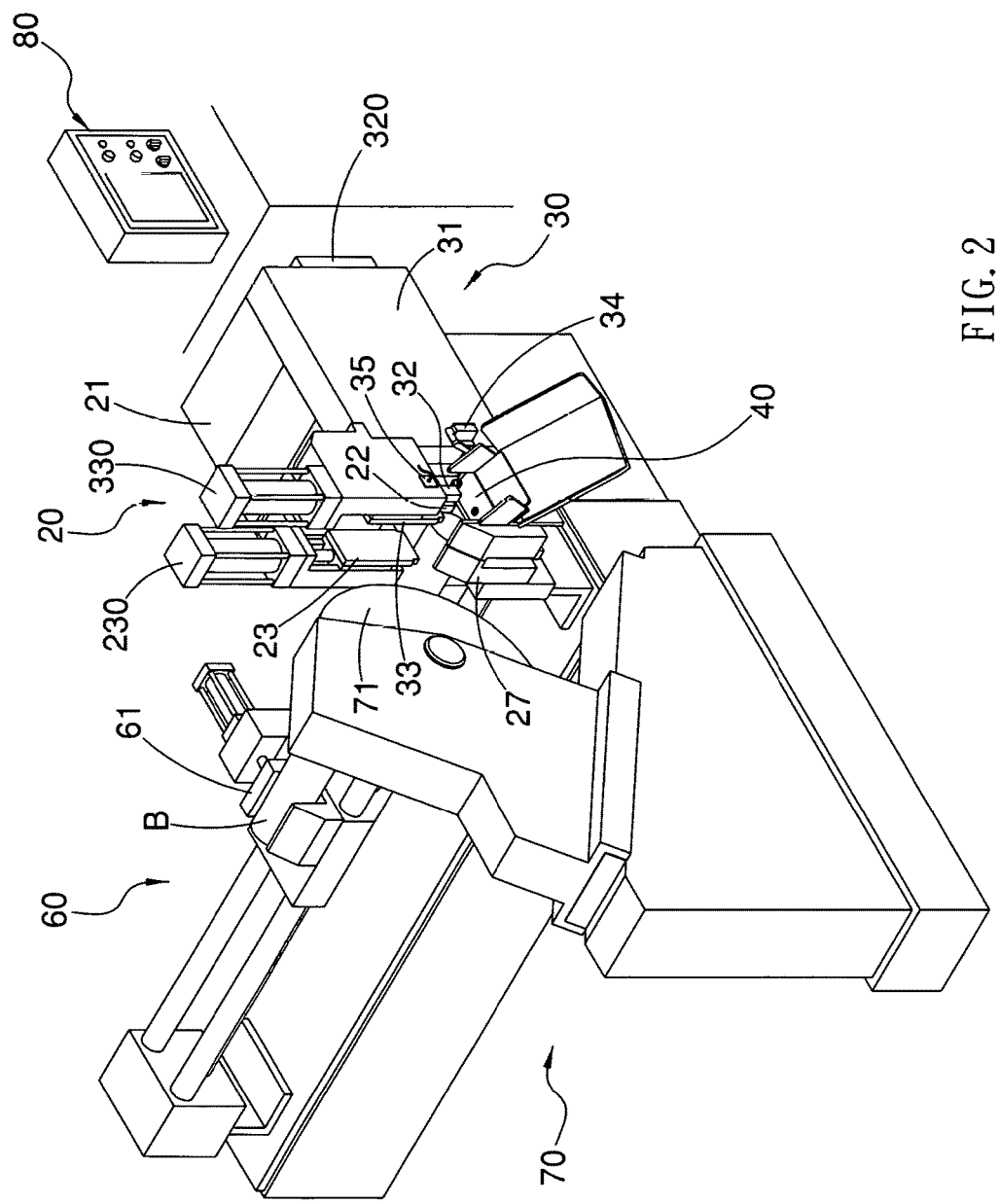
FIG. 2 is a perspective view showing the assembly of a circular saw machine according to a first embodiment of the present invention.
Figure 3:
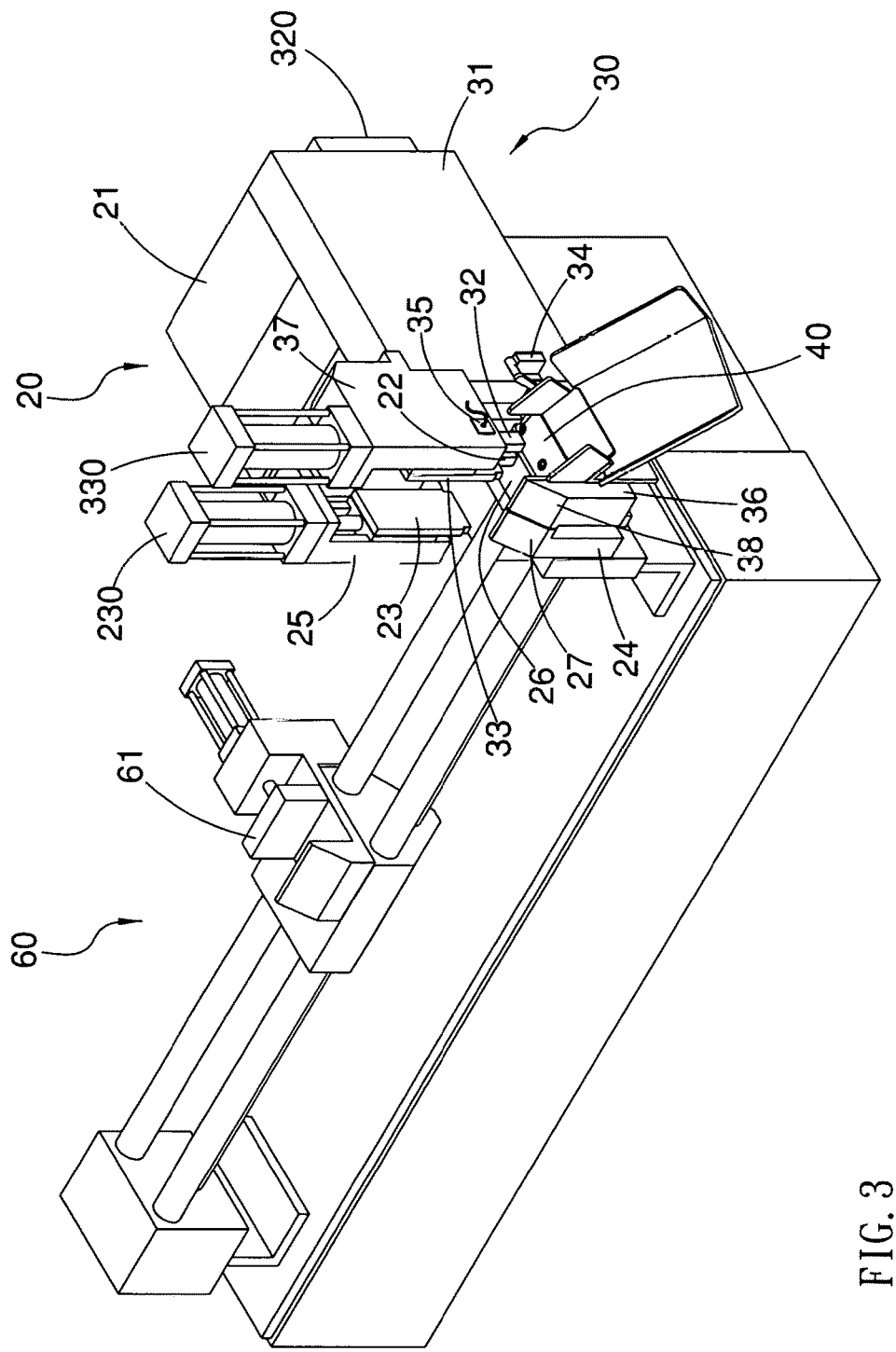
FIG. 3 is another perspective view showing the assembly of the circular saw machine according to the first embodiment of the present invention.
Figure 4:
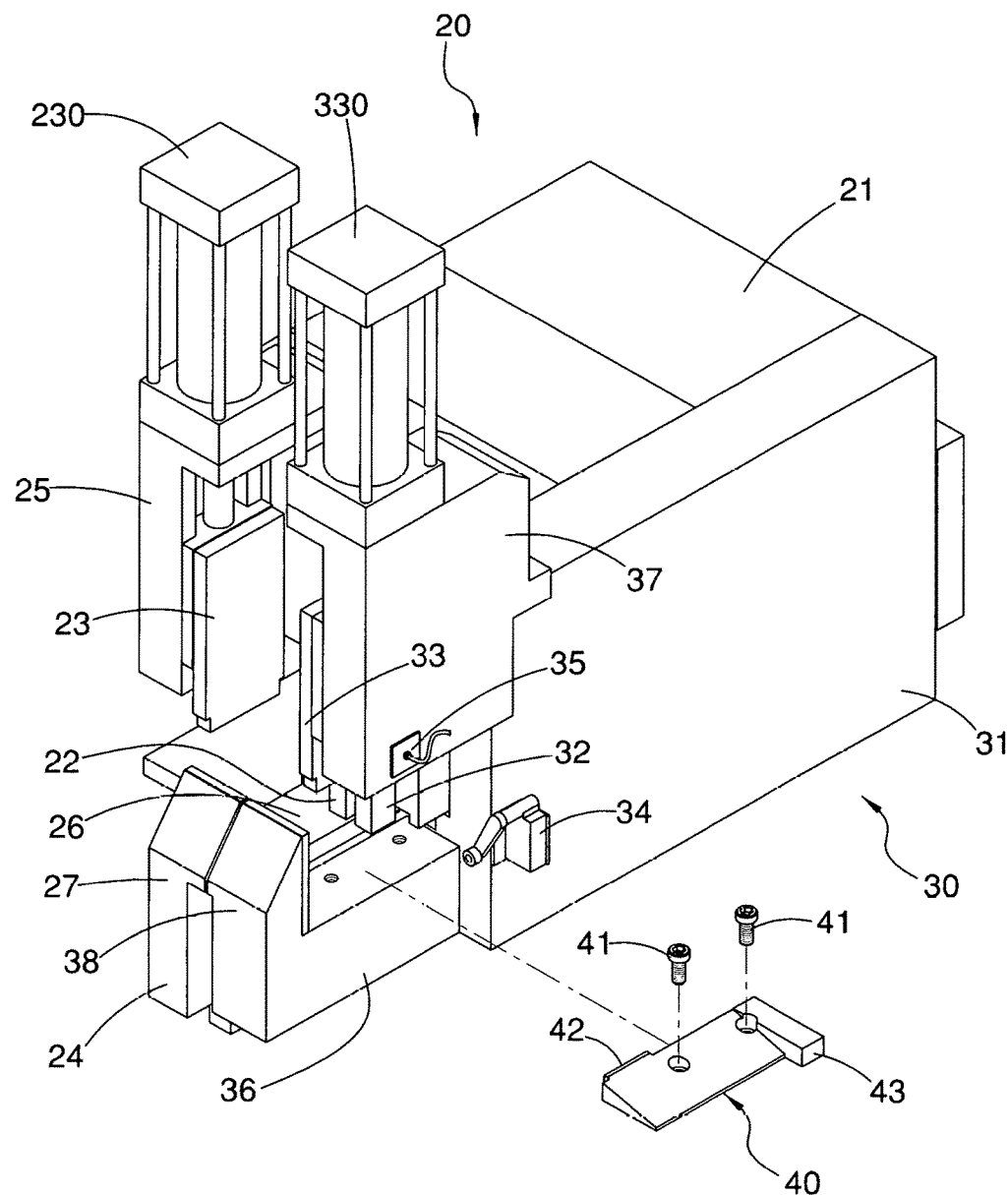
FIG. 4 is a perspective view showing the exploded components of a holding plate of the circular saw machine according to the first embodiment of the present invention.

With reference to FIGS. 2-7, a circular saw machine for sawing workpieces of various lengths according to a preferred embodiment of the present invention comprises: a first clamping device 20, a second clamping device 30, a holding member 40, a feeding means 60, a sawing device 70, and a control system 80.

The first clamping device 20 includes a first clamp mount 21, a movable clamp block 22, and a first upper clamp block 23. The first clamp mount 21 has a first fixing arm 24 disposed on one side thereof, a first holder 25 mounted above the first fixing arm 24, a placing portion 26 fixed on the first fixing arm 24 to place a non-sawed workpiece B, and a first fixed clamp block 27 secured on an end portion of the first fixing arm 24. The first movable clamp block 22 is driven by a first horizontal cylinder (not shown) to horizontally move on the first clamp mount 21 and to cooperate with the first fixed clamp block 25 so as to clamp two side surfaces of the non-sawed workpiece B. The first upper clamp block 23 is driven by a first vertical cylinder 230 to vertically move on the first holder 25 and to match with the placing portion 26 so as to clamp an upper surface and a lower surface of the non-sawed workpiece B.

The second clamping device 30 includes a second clamp mount 21, a second movable clamp block 32, a second upper clamp block 33, a detecting switch 34, and a protective sensor 35. The second clamp mount 31 is located outside the first clamp mount 21 and is driven by a servo motor (not shown) to horizontally move close to or away from the first clamp mount 21. The first clamp mount 21 has a second clamp arm 36 parallel to first clamp arm 24, a second holder 37 located above the second clamp arm 36, and a second fixed clamp block 38 arranged on an end portion of the second clamp arm 36. The second movable clamp block 32 is driven by a second horizontal cylinder 320 on the second clamp mount 31 to horizontally move on the second clamp mount 31 and to cooperate with the second fixed clamp block 38 so as to clamp the two side surfaces of the non-sawed workpiece B. The second upper clamp block 33 is driven by a second vertical cylinder 330 on the second holder 37 to vertically move on the second holder 37 and to presses the upper surface of the non-sawed workpiece B. The detecting switch 34 is mounted on the second clamp mount 31 and transmits a signal as being driven. The protective sensor 35 is fixed on the second holder 37 to sense whether the second upper clamp block 33 moves downwardly and transmits a detecting signal.

The holding plate 40 is secured on a top end of the second clamp arm 36 by ways of two coupling bolts 41, and the top end of the holding plate 40 is a tilted face, the first holding plate 40 includes a protrusion 42 horizontally extending from a first side thereof to the first clamp arm 24, between the protrusion 42 and the feeding portion 26 of the first clamp arm 24 is defined a sawing slit. The holding plate 40 also includes an extension 43 formed on a second side thereof, such that when the holding plate 40 is connected with the second clamp arm 36, the extension 43 does not touch the detecting switch 34.

The feeding means 60 is disposed on one side of the first clamping device 20 and includes a third clamping device 61 for clamping the non-sawed workpiece B and for pushing the non-sawed workpiece B toward the first clamping device 20 and the second clamping device 30.

The sawing device 70 is mounted between the first clamping device 20 and the second clamping device 30 and includes a saw disc 71 moving toward a sawing gap between the first clamping device 20 and the second clamping device 30 to saw one end of the non-sawed workpiece B into a sawed workpiece B1, and then the sawed workpiece B1 is clamped by the second clamping device 30.

The control system 80 outputs working data so that the first clamping device 20, the second clamping device 30, the feeding means 60 and the sawing device 70 execute sawing process, wherein the control system 80 is connected with the detecting switch 34 and the protective sensor 35 to receive the detecting signal from the detecting switch 34 and a sensing report from the protective sensor 35 and to judge whether the working data is normal, and when the working data is not normal, the control system 80 stops the circular saw machine and makes a warming signal.

Figure 6:
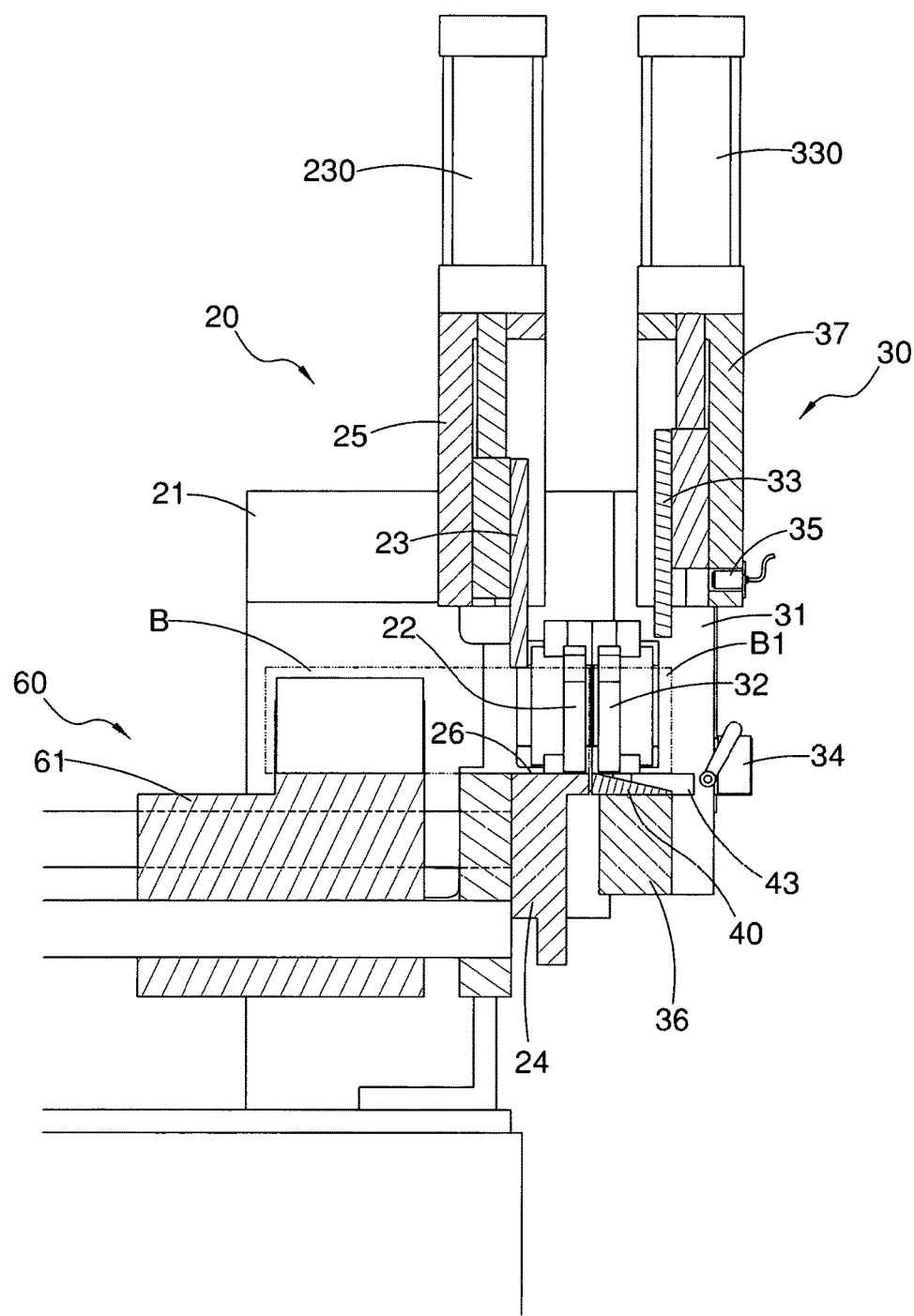
FIG. 6 is a cross sectional view showing the operation of the circular saw machine according to the first embodiment of the present invention.
Figure 7:
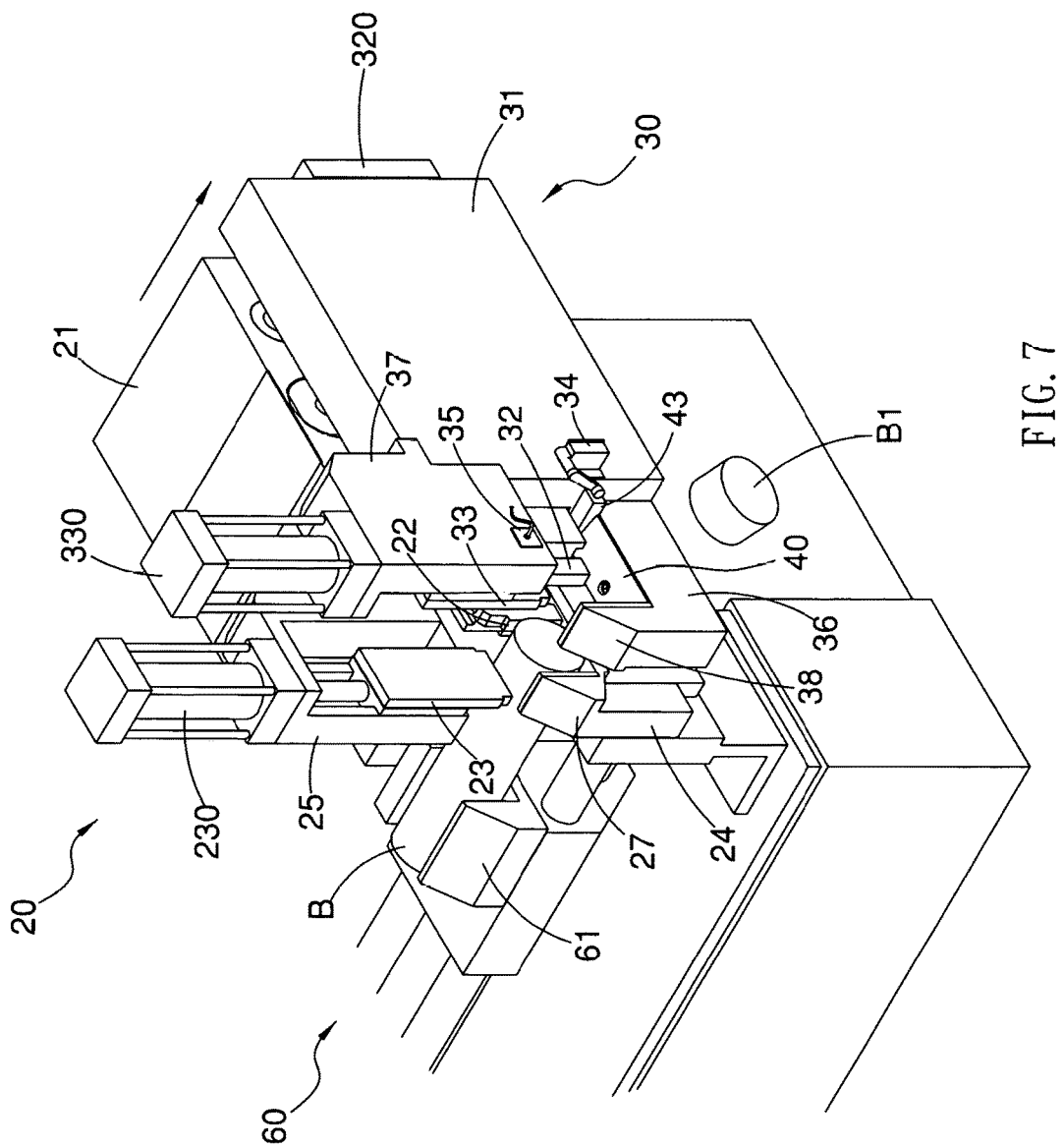
FIG. 7 is a perspective view showing the operation of the circular saw machine according to the first embodiment of the present invention.

In operation, the working data, such as a sawing length to the sawed workpiece B1 is inputted into the control system 80, and then the control system 80 controls the feeding means 60 to feed the non-saw workpiece B toward the first clamping device 20 and the second clamping device 30 so as to be clamped by the first clamping device 20 and the second clamping device 30, and then the saw disc 71 of the sawing device 70 moves to the sawing gap between the first clamping device 20 and the second clamping device 30 to saw the non-saw workpiece B into the sawed workpiece B1, thereafter the sawed workpiece B1 is clamped by the second clamping device 30 as shown in FIG. 6. Referring to FIG. 7, the sawed workpiece B1 is further unclamped by the second clamping device 30, and the saw disc 71 moves away from the sawing gap, such that the sawed workpiece B1 is not sucked by vacuum suction from the saw disc 71 and is not sawed by the saw disc 71 again, thus protecting the sawed workpiece B1.

Furthermore, a front end of the non-saw workpiece B is clamped by the second clamping device 30, and the third clamping device 61 of the feeding means 60 unclamps a rear end of the non-saw workpiece B, the second clamping device 30 outwardly clamps the non-saw workpiece B at a suitable working length, and the first clamping device 10 clamps the non-saw workpiece B, thereafter the second clamping device 30 unclamps the front end of the non-saw workpiece B and moves back to an original position to clamp the non-saw workpiece B so that the saw disc 71 saws the non-saw workpiece B. Thereby, the non-saw workpiece B is sawed into plural sawed workpieces B1 to save material cost.

Figure 5:
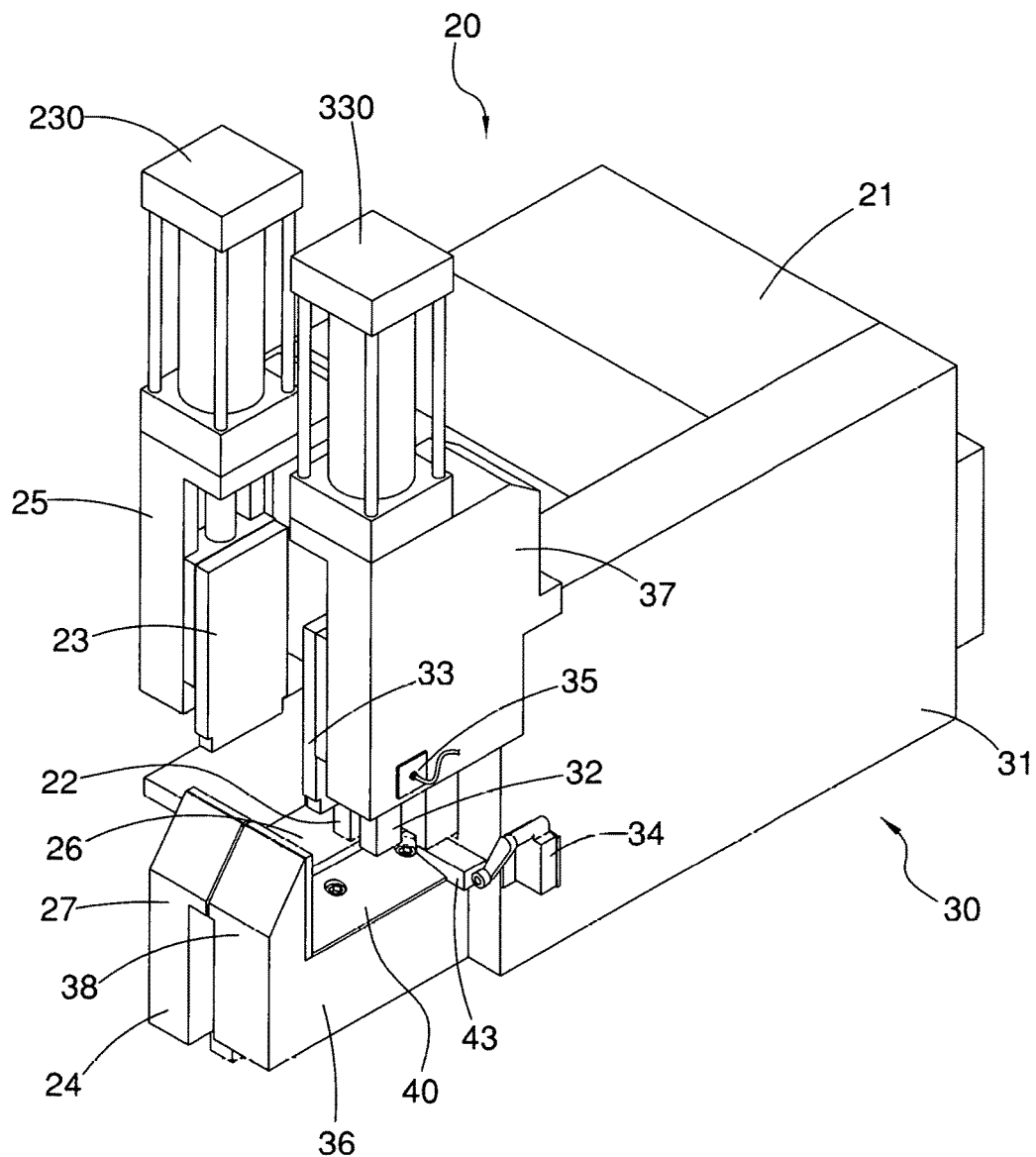
FIG. 5 is a perspective view showing the holding plate being fixed on a second clamp arm according to the first embodiment of the present invention.

As desiring to saw a thin sawed workpiece B1, the holding plate 40 is fixed on the second clamp arm 36 of the second clamping device 30, such that the extension 43 of the holding plate 40 does not touch the detecting switch 34, the control system 80 judges the thin sawed workpiece B1 because the detecting switch 34 does not transmit a touch signal. Accordingly, the second upper clamp block 33 of the second clamping device 30 is controlled by the control system 80 in a sawing process to not operate, hence the sawed workpiece B1 is not pressed obliquely, when the second upper clamp block 33 presses the sawed workpiece B1 to move along the top end of the holding plate 40. To avoid manual setting error of the second upper clamp block, the protective sensor 35 detects if the second upper clamp block 33 moves downwardly as illustrated in FIGS. 5 and 6. If so, the control system 80 judges whether the working data is in compliance with the sensing signal of the detecting switch 34 and the sensing report of the protective sensor 35. If not, the circular saw machine stops operation and makes the warming signal, thus forming a protection mechanism. The thin sawed workpiece B1 means that the second fixed clamp 38 and the second movable clamp 32 clamp the thin sawed workpiece B1 without oblique. For instance, when a length of the thin sawed workpiece B1 is 100 mm, the second fixed clamp 38 and the second movable clamp 32 clamp the thin sawed workpiece B1 without oblique. Therefore, when the sawing disc 71 saws into the thin sawed workpiece B1, the second fixed clamp block 38 of the second clamping device 30 and the second movable clamp block 32 clamp and move the thin sawed workpiece B1 for a distance and then unclamp the thin sawed workpiece B1 so that the thin sawed workpiece B1 falls along the top end of the holding plate 40, thereby eliminating sawing chips automatically as shown in FIG. 7.

Figure 8:
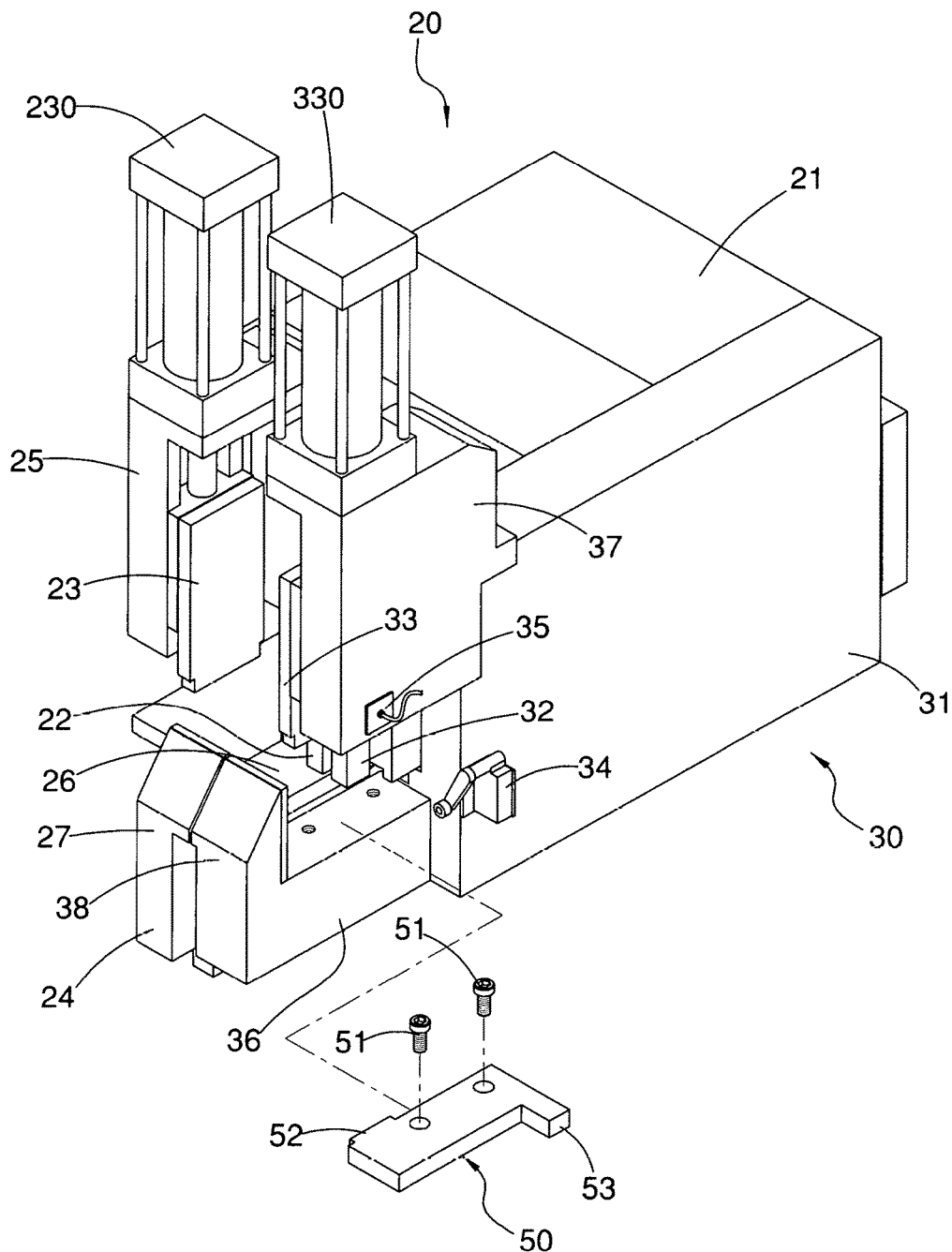
FIG. 8 is a perspective view showing the exploded components of a holding plate of a circular saw machine according to a second embodiment of the present invention.
Figure 9:
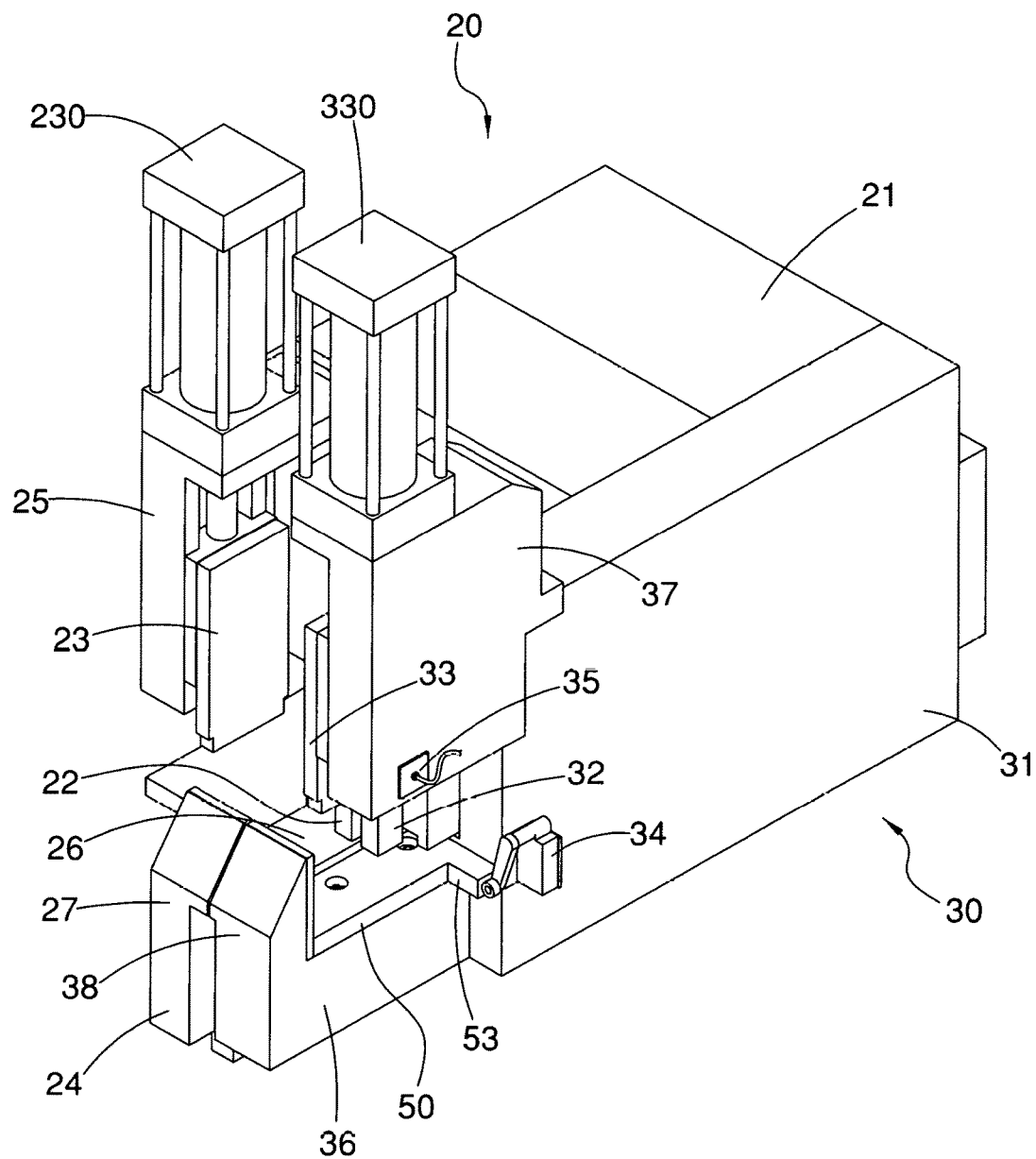
FIG. 9 is a perspective view showing the holding plate being fixed on a second clamp arm according to the second embodiment of the present invention.
Figure 10:
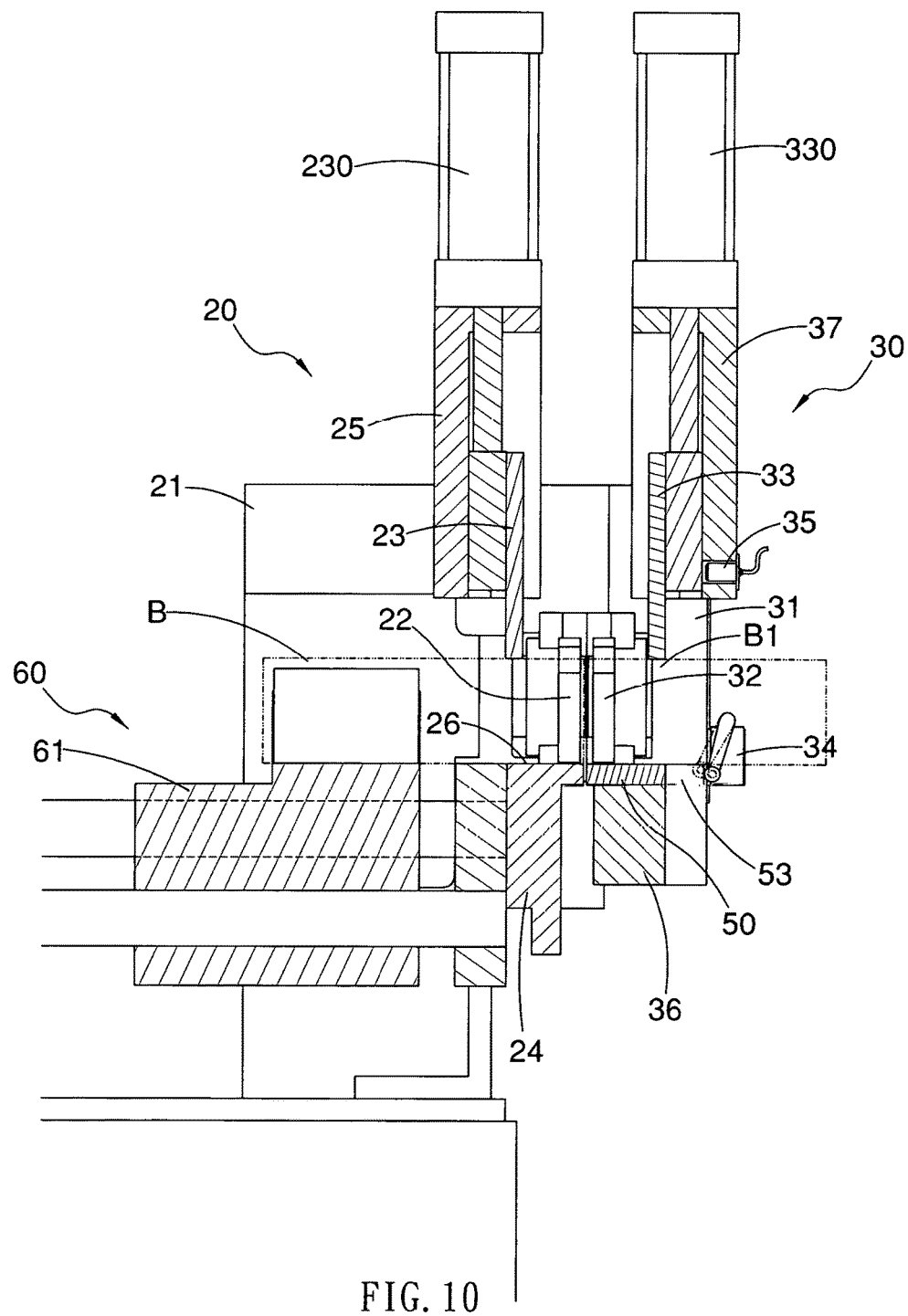
FIG. 10 is a cross sectional view showing the operation of the circular saw machine according to the second embodiment of the present invention.

Referring to FIGS. 8-10, a difference of a circular saw machine of a second embodiment from that of the first embodiment comprises a holding plate 50 which is configured to hold a long sawed workpiece B1 and is secured on the top end of the second clamp arm 36 by ways of two second coupling bolts 51, wherein a top end of the holding plate 50 is a flat face for matching with the second upper clamp block 33 so as to clamp the upper surface and the lower surface of the non-sawed workpiece B, the holding plate 50 includes a protrusion 52 horizontally extending from a first side thereof to the first clamp arm 24, between the protrusion 52 and the feeding portion 26 of the first clamp arm 24 is defined a sawing slit. The second plate 50 also includes an extension 53 formed on a second side thereof, such that when the holding plate 50 is coupled with the second clamp arm 36, the extension 53 touches the detecting switch 34.

As desiring to saw the long sawed workpiece B1, the second holding plate 50 is fixed on the second clamp arm 36 of the second clamping device 30, and the extension 53 of the second holding plate 50 touches the detecting switch 34 as illustrated in FIG. 9, the control system 80 judges the long sawed workpiece B1 by receiving the sensing signal from the sensing switch 34. The control system 80 controls the second upper clamp block 33 of the second clamping device 30 to clamp the long sawed workpiece B1 in the sawing process, and the holding plate 50 clamps an upper surface and a lower surface of the long sawed workpiece B1 so that the long sawed workpiece B1 is not tilted as shown in FIG. 10. The long sawed workpiece B1 means that the second fixed clamp block 38 and the second movable clamp block 32 clamp the long sawed workpiece B1 without oblique. For instance, when a length of the long sawed workpiece B1 is 150 mm, the second fixed clamp block 38 and the second movable clamp block 32 clamp the long sawed workpiece B1 and tilt downwardly. Accordingly, when the sawing disc 71 saws the long sawed workpiece B1, the second fixed clamp block 38 of the second clamping device 30 and the second movable clamp block 32 clamp the two side surfaces of the long sawed workpiece B1, and the second upper clamp block 33 and the top end of the second holding plate 50 clamp the two side surfaces of the long sawed workpiece B1 so as to prevent the long sawed workpiece B1 from oblique, the second clamping device 30 clamps the long sawed workpiece B1 and moves the long sawed workpiece B1 for a distance, then the second movable clamp block 32 and the second upper clamp block 33 unclamp the long sawed workpiece B1, thereafter the long sawed workpiece B1 falls naturally, thus eliminating the sawing chips automatically.

Accordingly, the circular saw machine saws the workpieces of various lengths.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A circular saw machine comprising:

a first clamping device including a first clamp mount, a movable clamp block, and a first upper clamp block, the first clamp mount having a first fixing arm disposed on one side thereof, a holder mounted above the first fixing arm, a placing portion fixed on the first fixing arm to place a non-sawed workpiece, and a first fixed clamp block secured on an end portion of the first fixing arm, the first movable clamp block horizontally moving on the first clamp mount and cooperating with the first fixed clamp block so as to clamp two side surfaces of the non-sawed workpiece, the first upper clamp block vertically moving on the first holder and matching with the placing portion so as to clamp an upper surface and a lower surface of the non-sawed workpiece;

a second clamping device including a second clamp mount, a second movable clamp block, and a second upper clamp block, the second clamp mount being located outside the first clamp mount and horizontally moving close to or away from the first clamp mount, the first clamp mount having a second clamp arm parallel to first clamp arm, a second holder located above the second clamp arm, and a second fixed clamp block arranged on an end portion of the second clamp arm, a second movable clamp block horizontally moving on the second clamp mount and cooperating with the second fixed clamp block so as to clamp the two side surfaces of the non-sawed workpiece, the second upper clamp block vertically moving on the second holder and pressing the upper surface of the non-sawed workpiece;

a holding plate configured to hold a thin sawed workpiece;

as desiring to hold the thin sawed workpiece, the holding plate secured on a top end of the second clamp arm, and between the top end of the second clamp arm and the feeding portion of the first clamp arm being defined a sawing slit, and, a top end of the holding plate being a tilted face;

a feeding device disposed on one side of the first clamping device and clamping the non-sawed workpiece to push the non-sawed workpiece toward the first clamping device and the second clamping device;

a sawing device including a saw disc moving toward a sawing gap between the first clamping device and the second clamping device so as to saw one end of the non-sawed workpiece into a sawed workpiece, and the sawed workpiece being clamped by the second clamping device;

a control system for outputting working data so that the first clamping device, the second clamping device, the feeding device and the sawing device execute sawing process, wherein the second clamping device includes a detecting switch mounted on the second clamp mount, and the holding plate also includes an extension formed on a second side thereof.

2. The circular saw machine as claimed in claim 1, wherein the second clamping device includes a protective sensor fixed on the second holder to sense whether the second upper clamp block moves downwardly and transmits a detecting signal to the control system, when the first holding plate is fixed on the second clamp arm, and the protective sensor senses the second upper clamp block moves downwardly, the control system makes a warning signal so that the circular saw machine is stopped by user.

3. The circular saw machine as claimed in claim 2, wherein the holding plate includes a protrusion horizontally extending from a first side thereof to the first clamp arm, wherein when the holding plate is fixed on the top end of the second clamping device, between the protrusion and the feeding portion of the first clamp arm is defined the sawing slit.

4. A circular saw machine comprising:

a first clamping device including a first clamp mount, a movable clamp block, and a first upper clamp block, the first clamp mount having a first fixing arm disposed on one side thereof, a holder mounted above the first fixing arm, a placing portion fixed on the first fixing arm to place a non-sawed workpiece, and a first fixed clamp block secured on an end portion of the first fixing arm, the first movable clamp block horizontally moving on the first clamp mount and cooperating with the first fixed clamp block so as to clamp two side surfaces of the non-sawed workpiece, the first upper clamp block vertically moving on the first holder and matching with the placing portion so as to clamp an upper surface and a lower surface of the non-sawed workpiece;

a second clamping device including a second clamp mount, a second movable clamp block, and a second upper clamp block, the second clamp mount being located outside the first clamp mount and horizontally moving close to or away from the first clamp mount, the first clamp mount having a second clamp arm parallel to first clamp arm, a second holder located above the second clamp arm, and a second fixed clamp block arranged on an end portion of the second clamp arm, a second movable clamp block horizontally moving on the second clamp mount and cooperating with the second fixed clamp block so as to clamp the two side surfaces of the non-sawed workpiece, the second upper clamp block vertically moving on the second holder and pressing the upper surface of the non-sawed workpiece;

a holding plate configured to hold a long sawed workpiece; as desiring to hold the long sawed workpiece, the holding plate secured on a top end of the second clamp arm, and a top end of the holding plate being a flat face, between the top end of the holding plate and the feeding portion of the first clamp arm being defined a sawing slit;

a feeding device disposed on one side of the first clamping device and clamping the non-sawed workpiece to push the non-sawed workpiece toward the first clamping device and the second clamping device;

a sawing device including a saw disc moving toward a sawing gap between the first clamping device and the second clamping device so as to saw one end of the non-sawed workpiece into a sawed workpiece, and the sawed workpiece being clamped by the second clamping device;

a control system for outputting working data so that the first clamping device, the second clamping device, the feeding device and the sawing device execute sawing process, wherein the second clamping device includes a detecting switch mounted on the second clamp mount, and the holding plate also includes an extension formed on a second side thereof, when the holding plate is coupled with the second clamp arm, the extension touches the detecting switch, after the detecting switch transmits a driving signal to the control system, the control system drives the circular saw machine to saw the non-sawed workpiece and judges if the working data is compliance with requirement based on the driving signal;

wherein when the holding plate is fixed on the top end of the second clamp arm, between the top end of the holding plate and the feeding portion of the first clamp arm is defined the sawing slit.

5. The circular saw machine as claimed in claim 4, wherein the second clamping device includes a protective sensor fixed on the second holder to sense whether the second upper clamp block moves downwardly and transmits a detecting signal to the control system, when the holding plate is fixed on the second clamp arm, and the protective sensor senses the second upper clamp block moves downwardly, the control system makes a warming signal so that the circular saw machine is stopped by user.

6. The circular saw machine as claimed in claim 4, wherein the second holding plate includes a protrusion horizontally extending from a first side thereof to the first clamp arm, when the holding plate is fixed on the top end of the second clamp arm, between the protrusion and the feeding portion of the first clamp arm is defined the sawing slit.

* * * * *